(12) United States Patent
Griffin et al.

(10) Patent No.: US 7,080,559 B1
(45) Date of Patent: Jul. 25, 2006

(54) TRANSDUCER

(75) Inventors: Christopher John Griffin, Singapore (SG); Bryan Keith Patmon, Singapore (SG)

(73) Assignee: Sensfab PTE LTD, Singapore (SG)

( * ) Notice: Subject to any disclaimer, the term of this patent is extended or adjusted under 35 U.S.C. 154(b) by 0 days.

(21) Appl. No.: 11/076,239

(22) Filed: Mar. 8, 2005

(51) Int. Cl.
*G01L 7/00* (2006.01)

(52) U.S. Cl. .......................... 73/706; 73/756
(58) Field of Classification Search ................. 73/706, 73/756
See application file for complete search history.

(56) References Cited

U.S. PATENT DOCUMENTS 5,540,100 A    7/1996  Von Berg

FOREIGN PATENT DOCUMENTS

EP    0330011    8/1989

*Primary Examiner*—Eric S. McCall
(74) *Attorney, Agent, or Firm*—Townsend and Townsend and Crew LLP

(57) ABSTRACT

A transducer for measuring the pressure of a fluid has a housing having a fluid contact region, a cavity divided from the third fluid contact region by a dividing wall, and an aperture through the dividing wall. A sensor component is located in the cavity and has a substrate carrying a pressure sensor. A rigid support block is mounted on the substrate and includes a surface facing the dividing wall off the housing. A spigot from this surface extends into the aperture of the dividing wall. A passage extends through the spigot and the support block to the sensor on the substrate. The passage is filled with a pressure transmitting medium. A resilient seal is located around the spigot and sandwiched between the support block surface and the dividing wall of the housing. A receiver is secured into the housing. The receiver holds the seal, with the spigot in the aperture.

20 Claims, 2 Drawing Sheets

TRANSDUCER

TECHNICAL FIELD

A transducer for applications where a fluid pressure measurement is required, including medical applications.

BACKGROUND ART

The present invention relates to a type of pressure transducer including a sensing element mounted on a substrate where the pressure of a fluid is transferred to the ceramic sensing element by a flexible media isolating material such as a medical grade media isolating soft gel, typically polydimethylsiloxane or similar.

One prior art transducer of this type is illustrated in FIG. 4 this transducer includes a housing 400 with a fluid channel 402 extending across one outer side. The fluid channel is terminated with lure connectors or similar (not shown) for connecting a fluid transmission line to each end. In use the fluid for which the pressure is to be monitored occupies this channel. The housing includes a cavity 404 facing away from this channel. A dividing wall 480 separates the channel 402 from the cavity 404. A small upstand wall 408 is formed on the inner face of the cavity 404 around an aperture 406. The upstand wall 408 is spaced a small distance away from the aperture 406 to leave a narrow internal flange. A foamed polymer gasket 410 sits within the cavity 404 against the dividing wall 480. The gasket 410 has an aperture 420 fitting over and around the upstand wall 408. The gasket includes a raised pad. An array of linear conductors 424 is fixed to the top of the pad. A sensor component sits in the cavity against the foam gasket. The sensor component includes a silicon wafer substrate 430 carrying sensing element 432 and associated electrical and electronic circuitry. A resilient O-ring 428 is bonded to one side of the substrate 430. A rigid cap 426 is bonded to the other side of the wafer covering the sensing element 432. A small hole 440 in the centre of the cap allows pressure equalisation in the enclosed space. A media isolating gel 442 fills the central opening of the O-ring 428 down to the sensing element. The sensing component is located in the cavity 404 with the O-ring 428 located within the upstand wall 408 and compressed against the internal flange. This provides for a seal at the O-ring, while fluid in the channel may pass through the aperture and press against the exposed area of the isolating gel 442. Electrical contacts on the substrate 430 contact disparate groups of the array of electrical contacts 424 on the gasket. A cable component 450 is terminated at one end with a receiver component 452 that fits within the cavity 404. A pair of clips along each side of the receiver body interact with complementary clips of the housing 404 to hold the receiver body in place within the cavity. The receiver includes a recess 454 on the side facing the dividing wall 480. The sensing component fits within this recess with the O-ring 428 protruding. The base surface 456 of the recess presses against the outward face of the rigid cap, but the hole through the cap is in registration with an extension 464 of the recess. The receiver includes electrical contacts 460 extending from electrical conductors in the cable end 462 encapsulated by the receiver body. The electrical contacts 460 press against disparate groups of the array of conductors 424 on the raised pad of the gasket. These disparate groups at least roughly correspond with the same disparate groups that are in contact with the sensor component contacts to complete an electrical connection between the sensor contacts and receiver contacts. In this transducer design the soft gel isolating material is contained by the flexible O-ring. The inventor of the present invention has determined that this is a source of potential error.

Another prior art pressure transducer is described in U.S. Pat. No. 5,540,100. This is another example of a pressure transducer that includes a pressure measuring element on a ceramic substrate. The element is provided to be in fluid communication with a fluid channel. In this prior art design the sensing element and substrate are not isolated from the fluid in channel.

DISCLOSURE OF THE INVENTION

It is an object of the present invention to provide a pressure transducer for measuring fluid pressure which will go some way toward overcoming these disadvantages in the prior art or which will at least provide users of such transducers with a useful choice.

In a first aspect the present invention consists in a transducer for measuring the pressure of a fluid, comprising:

a housing having a fluid contact region, a cavity divided from the third contact region by a dividing wall, and an aperture through the dividing wall;

a sensor component located in said cavity and having a substrate carrying a pressure sensor, and a rigid support block mounted on said substrate including a surface facing said dividing wall, a spigot from said surface extending into said aperture, and a passage extending through said spigot and said support block to the sensor on the substrate, said passage filled with a pressure transmitting medium;

a resilient seal located around said spigot and sandwiched between said support block surface and said dividing wall; and a receiver secured into said housing, holding said sensor component in place against said seal, with said spigot in said aperture.

In a further aspect the present invention consists in a transducer for measuring the pressure of a fluid, comprising:

a housing having a fluid contact region, a cavity divided from the fluid contact region by a dividing wall, and an aperture through the dividing wall;

a sensor component located in said cavity and having pressure sensor, a rigid block including a surface facing said dividing wall, a spigot from said surface extending into said aperture, and a passage extending through said spigot and said block to the sensor said passage filled with a pressure transmitting medium;

a resilient seal located around said spigot and sandwiched between said block surface and said dividing wall; and means for holding said sensor component in place against said seal, with said spigot in said aperture.

In a still further aspect the present invention consists in a transducer for measuring the pressure of a fluid, a sensor component having ceramic wafer including a pressure sensor, a rigid support block mounted on said wafer, a spigot extending from said support block, and a passage extending through said spigot and said support block to the sensor on wafer, said channel filled with a pressure transmitting gel, a resilient seal located around said spigot and sandwiched between said support block surface and a housing.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION OF THE PREFERRED EMBODIMENTS

Figure 1:
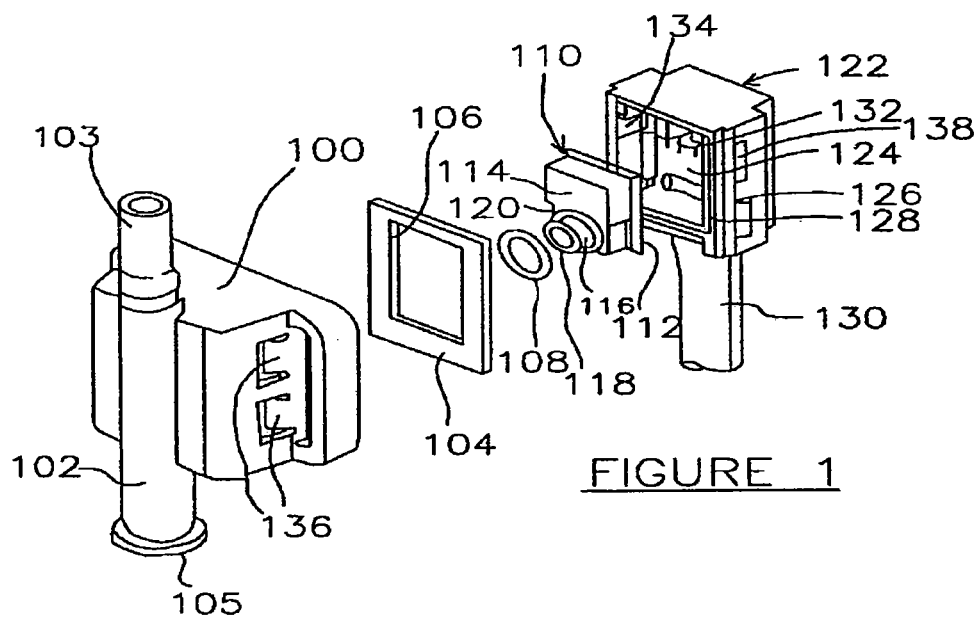
FIG. 1 is an assembly drawing showing the components of the transducer of the present invention.
Figure 2:
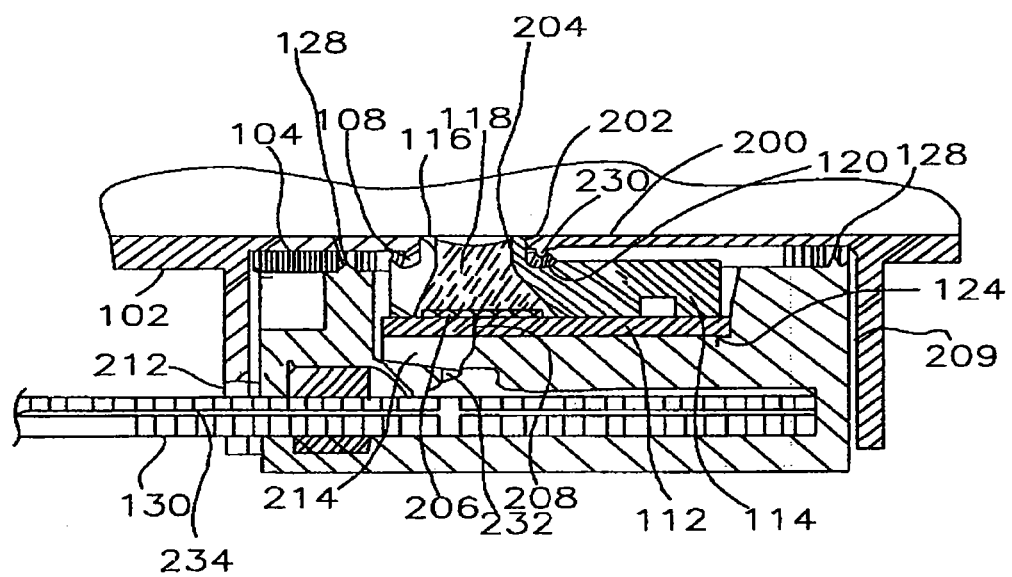
FIG. 2 is a cross-sectional side elevation of the assembled transducer according to the embodiment of FIG. 1.
Figure 3:
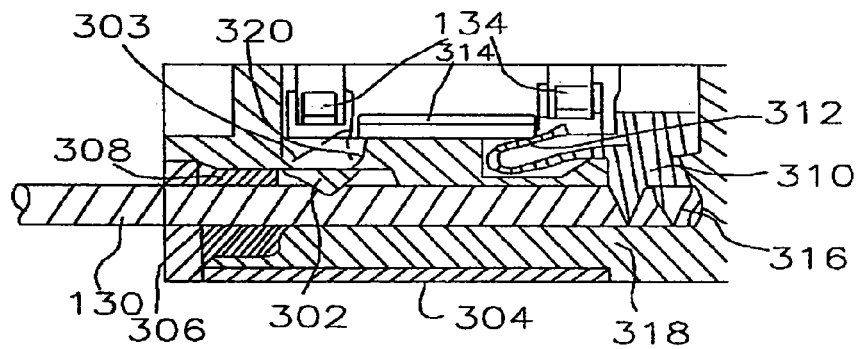
FIG. 3 is a cross-sectional side elevation of the receiver component of the embodiment of FIG. 1, taken on a different plane to the cross-section of FIG. 2, showing additional constructional detail.
Figure 4:
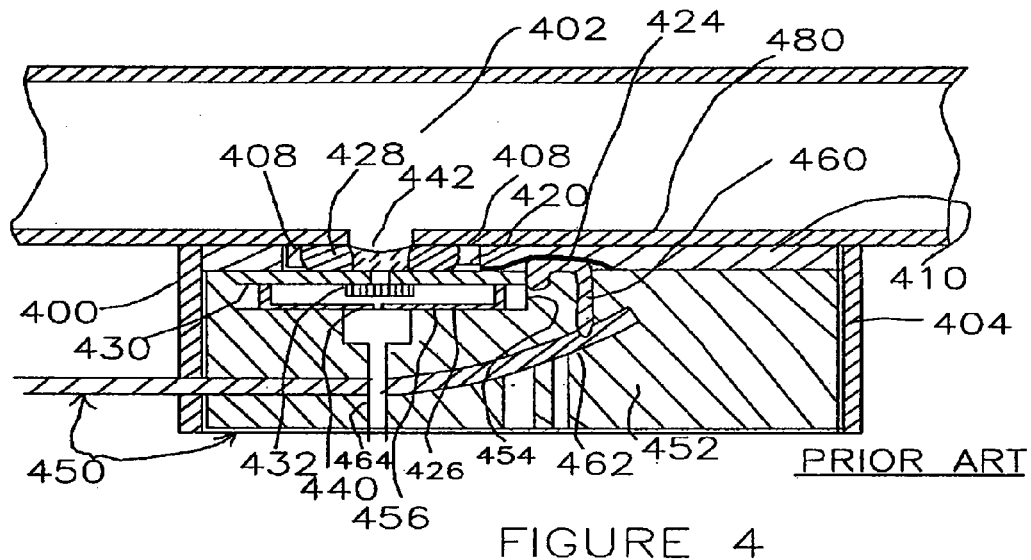
FIG. 4 is a cross-sectional side elevation of a prior art transducer which is described in detail above.

A transducer according to the preferred embodiment of the present invention is illustrated in FIGS. 1 to 3. In overall configuration the transducer is similar to the prior art transducer of FIG. 4. The transducer includes a housing 100 with a fluid channel 102 and a cavity separated from the fluid channel by a dividing wall. A sensor component 110 is located within the cavity. A pressure sensing element in the sensor component has fluid pressure transmitted to it through an isolating medium 118. The sensor component 110 is retained within the cavity by a receiver 122. The receiver 122 terminates a cable 130 and makes electrical connection with contacts on the substrate of the sensing component 110.

However, according to the present invention, the sensing component 110 includes a rigid block 114 bonded to the face of substrate 112 facing the dividing wall 200. A spigot 116 extends from the face of block 114 and protrudes into aperture 202 of the dividing wall 200. The resilient seal 108 is located around the spigot 116. A passage extends through the block 114 from the open end of spigot 116 to the substrate 112, encompassing a sensing element 206. This passage contains an isolating medium that transmits pressure from the fluid channel to the sensor. The rigid block 114 and spigot 116 protect the isolating medium 118 from being affected by compression of the O-ring 108 and protect the substrate 112 from flexing due to clamping pressure holding the sensing component within the housing.

The detailed construction of the preferred embodiment of the transducer is illustrated in FIGS. 1 to 3. The housing 100 includes a fluid flow channel in the form of a conduit 102. Connectors 103 and 105 are provided at either end of the conduit. The housing 100 includes a cavity 209 facing away from the conduit 102. The cavity 209 formed by a surrounding wall and by the dividing wall 200. The surrounding wall includes clips 136 on two opposed sides, and a notch 212 in one end. When the transducer is assembled the clips 136 cooperate with complementary abutments 138 on the receiver 122 to hold the receiver 122 within the cavity. The notch 212 accommodates the cable 130 extending from the receiver 122. The cavity 209 is separated from the interior of conduit 102 by the dividing wall 200. An aperture 202 is provided through the dividing wall 200 for communicating fluid pressure to the sensor component.

As illustrated in FIG. 1 the fluid zone contacting the transducer may be in the form of a conduit or chamber or may not form part of the housing per se. For example an outer wall of the housing may form a part of the wall of the chamber or part of the conduit containing fluid. However, in at least one form useful in the medical field, the fluid contact zone comprises the inside of an integrated conduit 102 with associated connectors at one or both ends. Suitable end connectors depend on the intended use of the transducer.

In the illustrated embodiment the housing is provided with clips 136 to retain a receiver 122. Alternatively the housing 100 may directly locate the sensor component 110 in the cavity 209 or against the dividing wall 200 without provision of a cavity per se.

Referring again to FIGS. 1 and 2 the sensor component 110 has a substrate 112. Preferably the substrate 112 is a ceramic wafer suitable for having electrical and/or electronic components formed or mounted thereon. The sensor 206, for example a silicon based piezoelectric straingage, is illustrated mounted on the side of the substrate 112 facing the dividing wall 200. It would be possible to mount the sensor on the other side of the substrate as in the prior art embodiment, and protect the sensor with a suitable rigid cover or cap. In that case a larger aperture through the substrate would be necessary to transmit fluid pressure through the substrate to the sensor.

In the illustrated embodiment the sensor 206 is located fully within passage 204. The passage 204 is substantially filled with isolating medium 118. Isolating medium 118 is preferably a soft gel such as polydimethylsiloxane or similar. The isolating medium is required to isolate the sensor from the fluid being monitored while transmitting pressure to the sensor.

A small aperture 208 is provided behind the sensor 206 through the substrate 112. This aperture allows the pressure behind the sensor diaphragm to equalise atmospheric pressure as a reference pressure.

Spigot 16 is sized to be a close fit within the aperture 202 of the housing 100.

The resilient seal 108 fits around the spigot 116. Preferably the resilient seal 108 is an O-ring of an elastomeric material, such as a fluoro elastomer or silicone rubber. Alternatively the seal may be a dispensed material such as a silicone RTV polymer which may be cured before or after assembly. If the seal is a dispensed material cured after assembly it will also provide weak adhesion between the sensor component and the dividing wall 200. It is preferred that this seal is an O-ring or similar so that it has a consistent size and shape and can be subjected to a known amount of pre-compression when the sensor component 110 is held at a known level within the housing. The O-ring 108 may sit within a shallow depression 120 around the base of the spigot 116 and be compressed by a small opposing ridge 230 on the dividing wall 200.

The rigid block 114 and spigot 116 are preferably integrally formed of a rigid plastic material such as polycarbonate. The block of rigid material may be preformed and substrate 112 they are formed onto the substrate 112 using adhesive such as a UV curable epoxy or overmoulding.

Contact pads are provided on the back face of the substrate 112 for outputting electrical signals from the sensor 206. These contact pads connect with contacts 132 (312 in FIG. 3) in the receiver 122.

The receiver 122 performs several functions. A first function of the receiver is to locate and secure the sensor component within the cavity 209 of the housing. A further function is to provide electrical connection with the output pads of the substrate 112 so that electrical signals indicative of the pressure sensed by the sensor 206 can be output via cable 130. A further function is to provide protection for the sensor component 110, for example from water ingress from outside the assembly. Transducers of the type according to the present invention are intended for use for example in a medical environment and may be subject to external flushing with saline solution or other fluids.

The receiver includes a cavity 124 sized to closely accommodate the sensor component 110. The cavity has a bottom face and four surrounding walls. The side walls of the preferred embodiment include clips 134 which can secure over edges of the substrate 112 which protrude beyond the rigid block 114. The clips 134 retain the substrate 112 against the base of recess 124. Locating features such as slightly tapered wall portions 314 may be provided at or near the base of the walls to accurately position the sensing element 110 in place while allowing the sensing element to be inserted without significant interference.

The receiver includes a recess 214 adjacent one end of the recess 124. This is preferably in registration below the small opening 208 in substrate 112.

More detailed construction of the receiver component may be discerned in FIG. 3. The end of cable 130 passes into an elongate cavity in body 318 of the receiver. The cable contains a plurality (for example four) of electrical conductors, and a hollow tube 234 (preferably in the center of the cable) for providing a vent for the reference pressure leading from the cavity 214 to atmosphere through the hollow tube in the cable.

A plurality (for example four) of metal contacts 310 are pressed into slots in the receiver body 318. Teeth 316 penetrate the cable 130 and make contact with the respective electrical conductor of the cable. Each electrical contact 310 includes a spring arm 312 with a head that, in a relaxed condition, lies above the bottom surface of the recess 124. These contact heads thereby press against the contact pads on the substrate 112 with the transducer assembled.

The cable 130 is further secured in position by an engaging element 302. The engagement element 302 is connected with body 318 by an integral hinge. When the body 318 is formed (for example by injection moulding) the element 302 is in an upward orientation as illustrated by broken line 303. When it is pushed into an engaged position an extremity of the element 302 is pushed past a protruding nose 303 of the body 318. The nose 303 then restrains the element 302 in the engaged position. In the engaged position an edge the surface of cable 130 bites into the shielding of the cable. The element 302 is shaped such that it does not seal the hollow tube in the cable when it is in the engaged position, rather, includes a notch 232 to provide a flow path connecting the hollow tube 234 to the cavity 214. A small hole penetrates the cable at the cavity 214 to provide an opening to the hollow tube 234.

Preferably a pliable PVC plug 308 is inserted as a sleeve or overmoulded on the cable prior to insertion into body 318. With the cable inserted into the body 318 the plug 308 substantially fills the open end of the cable receiving cavity. Subsequently a cover 304 is bonded to the rear surface of body 318, for example by ultrasonic welding. This encloses several openings that are necessary for manufacturing the body as illustrated. Then the ends of the plug are sealed by overmoulding, resulting in covering portions 306, for example. Alternatively, the openings may all be sealed in a single overmoulding operation, with or without the use of the pliable sleeve on the cable. Accordingly, apart from a bleed hole through the cable to cavity 214 (so that cavity 214 may remain at atmospheric pressure), the receiver is otherwise well sealed between the exterior surface and the interior of the cavity 214.

To seal between the receiver 122 and the dividing wall 200 (another potential path for fluid ingress to the region of the sensor) a gasket is preferably provided between the top surface of the receiver 122 and the surface of dividing wall 200. The gasket 104 is essentially an open frame sized and shaped to fit within the cavity 209, with an aperture 106 sized to accommodate at least the rigid block 114 of sensor component 110. The gasket may for example be formed from a silicone rubber or RTV polymer. The gasket may simply be sandwiched between the housing and the receiver, or may be bonded to one of the housing or receiver. Preferably one or both of the housing and receiver includes an annular ridge which presses into the gasket to promote a good seal. For example in the illustrated embodiment a ridge 128 is provided around the perimeter of the face of the receiver.

When assembled, as illustrated in FIG. 2, the receiver 122 is clipped into the housing 100, with clips 136 of the housing engaging abutments 138 on the receiver body. The relative locations of the clips ensures that the clearance between the top face of the receiver and the dividing wall 200 is a known interference fit for the gasket 104 and the gasket 104 is compressed between them. The ridge 128 further presses into the gasket 104. The bottom surface of cavity 124 presses against the underside of the substrate 112. The level of this bottom surface and the thickness of the sensing component are such that the O-ring 108 is sandwiched between the dividing wall 200 and the top surface of the rigid block 114. This provides an excellent seal in the region of the aperture 202 without affecting the isolating gel 118. The sensing component does not press against the perimeter gasket 104.

What is claimed is:

1. A transducer for measuring the pressure of a fluid, comprising:
    a housing having a fluid contact region, a cavity divided from the fluid contact region by a dividing wall, and an aperture through the dividing wall;
    a sensor component located in said cavity and having a substrate carrying a pressure sensor, and a rigid support block mounted on said substrate including a surface facing said dividing wall, a spigot from said surface extending into said aperture, and a passage extending through said spigot and said support block to the sensor on the substrate, said passage filled with a pressure transmitting medium;
    a resilient seal located around said spigot and sandwiched between said support block surface and said dividing wall; and
    a receiver secured into said housing, holding said sensor component in place against said seal, with said spigot in said aperture.

2. A transducer as claimed in claim 1 wherein said resilient seal is an O-ring fitted over said spigot.

3. A transducer as claimed in claim 2 wherein said support block surface includes an annular depression around said spigot and said O-ring is seated in said depression.

4. A transducer as claimed in claim 1 wherein said dividing wall includes a small annular ridge around a periphery of said aperture facing said sensor component, said small annular ridge pressing into said resilient seal.

5. A transducer as claimed in claim 1 wherein said receiver has a recess of size and shape to accommodate said sensor component, said sensor component is accommodated in said recess and a second resilient seal is sandwiched between said receiver and said housing around a periphery of said recess.

6. A transducer as claimed in claim 5 wherein at least one of said housing and said receiver include a small annular ridge facing the other of said housing and receiver, and said ridge presses into said second resilient seal.

7. A transducer as claimed in claim 5 wherein said receiver includes a transmission cable, said cable includes a hollow tube extending along its length, and said hollow tube is in gases communication with said recess.

8. A transducer as claimed in claim 5 wherein said sensor component is clipped into said recess in said receiver and said receiver is clipped into said housing, with the clips between said sensor component and said receiver and the clips between said receiver and said housing being located with respect to their respective components so as to locate said sensor component within said cavity in a position such that said resilient seal is sandwiched between said support block surface and said dividing wall.

9. A transducer for measuring the pressure of a fluid, comprising:
   a housing having a fluid contact region, a cavity divided from the fluid contact region by a dividing wall, and an aperture through the dividing wall;
   a sensor component located in said cavity and having pressure sensor, a rigid block including a surface facing said dividing wall, a spigot from said surface extending into said aperture, and a passage extending through said spigot and said block to the sensor said passage filled with a pressure transmitting medium;
   a resilient seal located around said spigot and sandwiched between said block surface and said dividing wall; and
   means for holding said sensor component in place against said seal, with said spigot in said aperture.

10. A transducer as claimed in claim 9 wherein said resilient seal is an O-ring fitted over said spigot.

11. A transducer as claimed in claim 10 wherein said block surface includes an annular depression around said spigot and said O-ring is seated in said depression.

12. A transducer as claimed in claim 9 wherein said dividing wall includes a small annular ridge around a periphery of said aperture facing said sensor component, said small annular ridge pressing into said resilient seal.

13. In a transducer for measuring the pressure of a fluid, a sensor component having ceramic wafer including a pressure sensor, a rigid support block mounted on said wafer, a spigot extending from said support block, and a passage extending through said spigot and said support block to the sensor on wafer, said passage filled with a pressure transmitting gel,
    a resilient seal located around said spigot and sandwiched between said support block surface and a housing.

14. A transducer as claimed in claim 13 wherein said resilient seal is an O-ring fitted over said spigot.

15. A transducer as claimed in claim 14 wherein said support block surface includes an annular depression around said spigot and said spigot is seated in said depression.

16. A transducer as claimed in claim 15 wherein a dividing wall has a small annular ridge around a periphery of an aperture facing said sensor component, said small annular ridge pressing into said resilient seal.

17. A transducer as claimed in claim 13 wherein a receiver has a recess of size and shape to accommodate said sensor component, said sensor component is accommodated in said recess and a second resilient seal is sandwiched between said receiver and said housing around a periphery of said recess.

18. A transducer as claimed in claim 17 wherein at least one of said housing and said receiver include a small annular ridge facing the other of said housing and receiver, and said ridge presses into said second resilient seal.

19. A transducer as claimed in claim 17 wherein said receiver includes a transmission cable, said cable includes a hollow tube extending along its length, and said hollow tube is in gases communication with said recess.

20. A transducer as claimed in claim 17 wherein said sensor component is clipped into said recess in said receiver and said receiver is clipped into said housing, with the clips between said sensor component and said receiver and the clips between said receiver and said housing being located with respect to their respective components so as to locate said sensor component within said cavity in a position such that said resilient seal is sandwiched between said support block surface and said dividing wall.

* * * * *